United States Patent
Zhu et al.

(10) Patent No.: US 10,225,318 B2
(45) Date of Patent: Mar. 5, 2019

(54) METHOD USED FOR HYPERTEXT TRANSFER PROTOCOL NETWORK, AND BROADBAND NETWORK GATEWAY

(71) Applicant: Huawei Technologies Co., Ltd., Shenzhen (CN)

(72) Inventors: Hengjun Zhu, Shenzhen (CN); Lehong Niu, Shenzhen (CN); Yong Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 163 days.

(21) Appl. No.: 14/975,475

(22) Filed: Dec. 18, 2015

(65) Prior Publication Data

US 2016/0105483 A1  Apr. 14, 2016

Related U.S. Application Data

(63) Continuation of application No. PCT/CN2014/078092, filed on May 22, 2014.

(30) Foreign Application Priority Data

Jun. 19, 2013  (CN) .......................... 2013 1 0244446

(51) Int. Cl.
 *H04L 29/08* (2006.01)
 *H04L 29/06* (2006.01)
 (Continued)

(52) U.S. Cl.
 CPC .......... *H04L 67/02* (2013.01); *G06F 9/45533* (2013.01); *H04L 29/08* (2013.01);
 (Continued)

(58) Field of Classification Search
 USPC ........................................................ 713/181
 See application file for complete search history.

(56) References Cited

U.S. PATENT DOCUMENTS

| 6,557,024 B1* | 4/2003 | Saito | ...................... H04L 29/06 707/999.01 |
| 8,516,080 B2* | 8/2013 | Chow | ............... G06F 17/30902 709/203 |

(Continued)

FOREIGN PATENT DOCUMENTS

| CN | 1577251 A | 2/2005 |
| CN | 102439913 A | 5/2012 |

(Continued)

OTHER PUBLICATIONS

IEEE6573027—preview May 2013 (Year: 2013).*
IPCOM000169431D, Apr. 2008 (Year: 2008).*

*Primary Examiner* — Kenneth W Chang
*Assistant Examiner* — BadriNarayanan C
(74) *Attorney, Agent, or Firm* — Slater Matsil, LLP

(57) ABSTRACT

Embodiments of the present invention provide a method used for an HTTP network, including: receiving, by a BNG, a first HTTP request sent by user equipment; adding, by the BNG, an identifier of the BNG to the first HTTP request, to obtain a second HTTP request; sending, by the BNG, the second HTTP request to an application server; receiving, by the BNG, a third HTTP request sent by the application server, where the third HTTP request includes location information of an image for creating a virtual machine; and obtaining, by the BNG, the image according to the location information, and creating, by the BNG, the virtual machine in the BNG according to the image.

16 Claims, 8 Drawing Sheets

(51) Int. Cl.
*G06F 9/455* (2018.01)
*G06F 9/50* (2006.01)

(52) U.S. Cl.
CPC .......... *H04L 63/0876* (2013.01); *H04L 67/28* (2013.01); *H04L 67/2833* (2013.01); *G06F 9/5005* (2013.01); *G06F 2009/4557* (2013.01)

(56) References Cited

U.S. PATENT DOCUMENTS

| | | | | |
|---|---|---|---|---|
| 8,812,670 B2* | 8/2014 | Haddad | ............... | H04L 12/2834 709/225 |
| 9,201,497 B2* | 12/2015 | Craine | ................... | G06F 13/10 |
| 9,634,854 B2* | 4/2017 | Lee | ..................... | H04L 12/2809 |
| 2004/0114176 A1* | 6/2004 | Bodin | ..................... | G06T 11/60 358/1.15 |
| 2005/0044233 A1* | 2/2005 | Cai | ......................... | H04L 29/06 709/227 |
| 2006/0184640 A1* | 8/2006 | Hatch | ................. | G06F 17/3087 709/217 |
| 2008/0199180 A1* | 8/2008 | Yang | ................... | H04L 12/4666 398/58 |
| 2008/0273878 A1* | 11/2008 | Wu | ....................... | H04J 3/1694 398/67 |
| 2008/0307035 A1* | 12/2008 | Burckart | ........... | G06F 17/30867 709/203 |
| 2008/0313615 A1* | 12/2008 | Cai | ......................... | H04L 29/06 717/121 |
| 2009/0327471 A1* | 12/2009 | Astete | ................. | G06F 9/45533 709/223 |
| 2010/0115511 A1* | 5/2010 | Kang | ................... | G06F 9/44505 718/1 |
| 2010/0223364 A1* | 9/2010 | Wei | ......................... | H04L 29/04 709/220 |
| 2010/0250880 A1* | 9/2010 | Minnatsu | ............ | G06F 11/1451 711/162 |
| 2010/0325287 A1* | 12/2010 | Jagadeeswaran | ....... | H04L 67/22 709/227 |
| 2011/0131330 A1* | 6/2011 | Beaty | .................... | G06F 9/5077 709/227 |
| 2011/0225623 A1* | 9/2011 | Wright | ................ | G06F 21/6218 726/1 |
| 2012/0005233 A1* | 1/2012 | Matsumoto | ....... | G06F 17/30221 707/797 |
| 2012/0210423 A1* | 8/2012 | Friedrichs | ............. | G06F 21/564 726/22 |
| 2012/0240110 A1* | 9/2012 | Breitgand | ........... | G06F 9/45558 718/1 |
| 2013/0145426 A1* | 6/2013 | Wright | .................... | H04L 63/10 726/3 |
| 2013/0276114 A1* | 10/2013 | Friedrichs | ............... | G06F 21/56 726/23 |
| 2014/0071811 A1* | 3/2014 | Niu | ..................... | H04L 41/0893 370/221 |
| 2014/0215574 A1* | 7/2014 | Erb | ....................... | H04L 63/10 726/4 |
| 2014/0223431 A1* | 8/2014 | Yoshimura | .......... | G06F 9/45558 718/1 |
| 2014/0337834 A1* | 11/2014 | Adogla | ............... | G06F 9/45558 718/1 |
| 2014/0343977 A1* | 11/2014 | Macina | .................. | G06Q 10/02 705/5 |

FOREIGN PATENT DOCUMENTS

CN 102938718 A 2/2013
CN 103152332 A 6/2013

* cited by examiner

METHOD USED FOR HYPERTEXT TRANSFER PROTOCOL NETWORK, AND BROADBAND NETWORK GATEWAY

This application is a continuation of International Application No. PCT/CN2014/078092, filed on May 22, 2014, which claims priority to Chinese Patent Application No. 201310244446.4, filed on Jun. 19, 2013, both of which are incorporated herein by reference in their entireties.

TECHNICAL FIELD

Embodiments of the present invention relate to communications technologies, and in particular, to a method used for a Hypertext Transfer Protocol (HTTP) network, and a broadband network gateway (BNG).

BACKGROUND

An application client runs on user equipment. An application server end runs on an application server. A service is executed through an interaction between the application client and the application server end. For example, the application client may be the DBank client provided by Huawei or the Google Earth client provided by Google. The application server end may be the DBank server end provided by Huawei. The user equipment may be a personal computer (PC), a mobile phone (MP), or a personal digital assistant (PDA). The application server may be a web server. The service may be uploading a file to a cloud server. The file may be a video file or an audio file.

To execute the service, the user equipment needs to send an HTTP request. After receiving the HTTP request, the BNG forwards the HTTP request to a public network. The HTTP request arrives at the application server through the public network. After receiving the HTTP request, the application server sends an HTTP response corresponding to the HTTP request. After receiving the HTTP response, the BNG forwards the HTTP response to the user equipment. In the foregoing technical solution, much bandwidth of a network is occupied.

SUMMARY

Embodiments of the present invention provide a method used for an HTTP network, and a BNG, which help reduce occupation of bandwidth of a network.

According to a first aspect, a method used for an HTTP network is provided, including: receiving, by a BNG, a first HTTP request sent by user equipment; adding, by the BNG, an identifier of the BNG to the first HTTP request, to obtain a second HTTP request; sending, by the BNG, the second HTTP request to an application server; receiving, by the BNG, a third HTTP request sent by the application server, where the third HTTP request is sent by the application server after the application server receives the second HTTP request, and the third HTTP request includes location information of an image (image) for creating a virtual machine (VM); and obtaining, by the BNG, the image according to the location information, and creating, by the BNG, the virtual machine in the BNG according to the image.

In the foregoing technical solution, the BNG creates the virtual machine in the BNG according to the image. An application server end runs on the virtual machine. After the virtual machine on which the application server end runs is deployed on the BNG, a service corresponding to an application client may be implemented through an interaction between the application server end on the BNG and the application client on the user equipment. The BNG does not need to forward, to the application server, the HTTP request sent by the user equipment. Therefore, the foregoing technical solution helps reduce occupation of bandwidth of a network.

In a first possible implementation manner of the first aspect, after the creating, by the BNG, the virtual machine in the BNG according to the image, the method further includes: sending, by the BNG, a first HTTP response to the application server, where the first HTTP response is a response corresponding to the third HTTP request, and the first HTTP response includes an identifier of the virtual machine; receiving, by the BNG, a second HTTP response sent by the application server, where the second HTTP response is a response corresponding to the second HTTP request, and the second HTTP response includes the identifier of the virtual machine; and forwarding, by the BNG, the second HTTP response to the user equipment.

According to the first aspect or the first possible implementation manner of the first aspect, in a second possible implementation manner of the first aspect, the identifier of the BNG includes a host name (host name) of the BNG, an Internet Protocol (IP) address of the BNG, or a uniform resource locator (URL) for identifying how to access the BNG.

According to the first aspect, the first possible implementation manner of the first aspect, or the second possible implementation manner of the first aspect, in a third possible implementation manner of the first aspect, the location information includes a URL for identifying how to access the image or includes a directory in which the image is stored in the BNG.

According to the first aspect, the first possible implementation manner of the first aspect, the second possible implementation manner of the first aspect, or the third possible implementation manner of the first aspect, in a fourth possible implementation manner of the first aspect, the second HTTP request includes a message-digest (MD), where the Message-Digest is obtained by performing an encryption operation on the identifier of the BNG according to a message-digest algorithm 5 (MD5).

According to the first aspect, the first possible implementation manner of the first aspect, the second possible implementation manner of the first aspect, the third possible implementation manner of the first aspect, or the fourth possible implementation manner of the first aspect, in a fifth possible implementation manner of the first aspect, the third HTTP request includes configuration information of the virtual machine; and the creating, by the BNG, the virtual machine in the BNG according to the image includes creating, by the BNG, the virtual machine in the BNG according to the image and the configuration information.

According to a second aspect, a method used for an HTTP network is provided, including: receiving, by a BNG, a first HTTP request sent by user equipment, where a virtual machine runs on the BNG; adding, by the BNG, an identifier of the virtual machine to the first HTTP request, to obtain a second HTTP request; sending, by the BNG, the second HTTP request to an application server; receiving, by the BNG, a command that is sent by the application server and used to deploy an application server end on the virtual machine; and deploying, by the BNG, the application server end on the virtual machine according to the command.

In the foregoing technical solution, the BNG deploys the application server end on the virtual machine according to the command that is sent by the application server and used to deploy the application server end on the virtual machine. After the BNG deploys the application server end on the virtual machine, a service corresponding to an application client may be implemented through an interaction between the application server end on the BNG and the application client on the user equipment. The BNG does not need to forward, to the application server, the HTTP request sent by the user equipment. Therefore, the foregoing technical solution helps reduce occupation of bandwidth of a network.

In a first possible implementation manner of the second aspect, after the deploying, by the BNG, the application server end on the virtual machine according to the command, the method further includes: receiving, by the BNG, a first HTTP response sent by the application server, where the first HTTP response includes the identifier of the virtual machine, and the first HTTP response is a response corresponding to the second HTTP request; and forwarding, by the BNG, the first HTTP response to the user equipment.

According to the second aspect or the first possible implementation manner of the second aspect, in a second possible implementation manner of the second aspect, the identifier of the virtual machine includes a host name of the virtual machine, an IP address of the virtual machine, or a URL for identifying how to access the virtual machine.

According to the first possible implementation manner of the second aspect, in a third possible implementation manner of the second aspect, the identifier of the virtual machine is carried in a header field (header field) or a payload (payload) of the first HTTP response.

According to a third aspect, a BNG is provided, including: a first receiving unit, configured to receive a first HTTP request sent by user equipment; an adding unit, configured to add an identifier of the BNG to the first HTTP request received by the first receiving unit, to obtain a second HTTP request; a first sending unit, configured to send the second HTTP request generated by the adding unit to an application server; a second receiving unit, configured to receive a third HTTP request sent by the application server, where the third HTTP request is sent by the application server after the application server receives the second HTTP request, and the third HTTP request includes location information of an image for creating a virtual machine; and a creation unit, configured to obtain the image according to the location information in the third HTTP request received by the second receiving unit, and create the virtual machine in the BNG according to the image.

In the foregoing technical solution, the BNG creates the virtual machine in the BNG according to the image. The application server end runs on the virtual machine. After the virtual machine on which the application server end runs is deployed on the BNG, a service corresponding to an application client may be implemented through an interaction between the application server end on the BNG and the application client on the user equipment. The BNG does not need to forward, to the application server, the HTTP request sent by the user equipment. Therefore, the foregoing technical solution helps reduce occupation of bandwidth of a network.

In a first possible implementation manner of the third aspect, the BNG further includes: a second sending unit, configured to send a first HTTP response to the application server, where the first HTTP response is a response corresponding to the third HTTP request, and the first HTTP response includes an identifier of the virtual machine; a third receiving unit, configured to receive a second HTTP response sent by the application server, where the second HTTP response is a response corresponding to the second HTTP request, and the second HTTP response includes the identifier of the virtual machine; and a forwarding unit, configured to forward the second HTTP response received by the third receiving unit to the user equipment.

According to the third aspect or the first possible implementation manner of the third aspect, in a second possible implementation manner of the third aspect, the identifier of the BNG includes a host name of the BNG, an IP address of the BNG, or a URL for identifying how to access the BNG.

According to the third aspect, the first possible implementation manner of the third aspect, or the second possible implementation manner of the third aspect, in a third possible implementation manner of the third aspect, the location information includes a URL for identifying how to access the image or includes a directory in which the image is stored in the BNG.

According to the third aspect, the first possible implementation manner of the third aspect, the second possible implementation manner of the third aspect, or the third possible implementation manner of the third aspect, in a fourth possible implementation manner of the third aspect, the second HTTP request includes an MD, where the MD is obtained by performing an encryption operation on the identifier of the BNG according to an MD5.

According to the third aspect, the first possible implementation manner of the third aspect, the second possible implementation manner of the third aspect, the third possible implementation manner of the third aspect, or the fourth possible implementation manner of the third aspect, in a fifth possible implementation manner of the third aspect, the third HTTP request includes configuration information of the virtual machine; and the creation unit is configured to create the virtual machine in the BNG according to the image and the configuration information.

According to a fourth aspect, a BNG is provided, including: a first receiving unit, configured to receive a first HTTP request sent by user equipment, where a virtual machine runs on the BNG; an adding unit, configured to add an identifier of the virtual machine to the first HTTP request received by the first receiving unit, to obtain a second HTTP request; a sending unit, configured to send the second HTTP request generated by the adding unit to an application server; a second receiving unit, configured to receive a command that is sent by the application server and used to deploy the application server end on the virtual machine; and a deployment unit, configured to deploy the application server end on the virtual machine according to the command received by the second receiving unit.

In the foregoing technical solution, the BNG deploys the application server end on the virtual machine according to the command that is sent by the application server and used to deploy the application server end on the virtual machine. After the BNG deploys the application server end on the virtual machine, a service corresponding to an application client may be implemented through an interaction between the application server end on the BNG and the application client on the user equipment. The BNG does not need to forward, to the application server, the HTTP request sent by the user equipment. Therefore, the foregoing technical solution helps reduce occupation of bandwidth of a network.

In a first possible implementation manner of the fourth aspect, the BNG further includes: a third receiving unit, configured to receive a first HTTP response sent by the application server, where the first HTTP response includes the identifier of the virtual a forwarding unit, configured to forward the first HTTP response received by the third receiving unit to the user equipment.

According to the fourth aspect or the first possible implementation manner of the fourth aspect, in a second possible implementation manner of the fourth aspect, the identifier of the virtual machine includes a host name of the virtual machine, an IP address of the virtual machine, or a URL for identifying how to access the virtual machine.

According to the first possible implementation manner of the fourth aspect, in a third possible implementation manner of the fourth aspect, the identifier of the virtual machine is carried in a header field or a payload of the first HTTP response.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Embodiments of the present invention provide a method used for an HTTP network, and a BNG, which help reduce occupation of bandwidth of a network.

Figure 1:
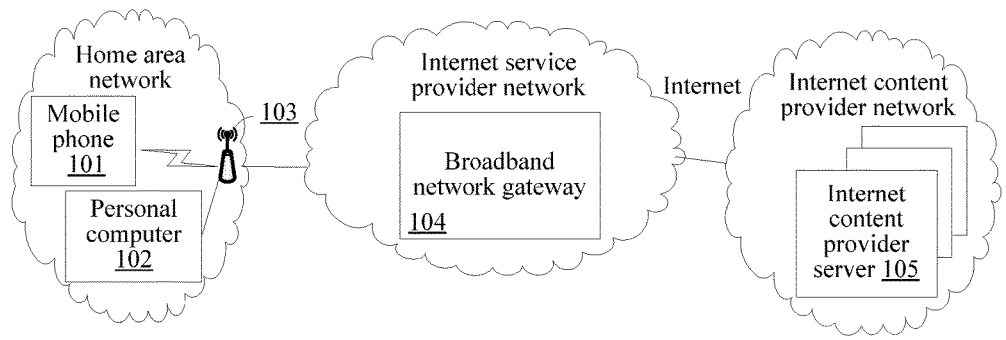
FIG. 1 is a structural diagram of networking of an application scenario of a technical solution according to an embodiment of the present invention.

FIG. 1 is a structural diagram of networking of an application scenario of a technical solution according to an embodiment of the present invention. The networking shown in FIG. 1 includes a home area network, an Internet service provider (ISP) server network, and an Internet content provider (ICP) server network. The home area network includes two UEs. The two UEs include a mobile phone 101 and a personal computer 102. The home area network further includes a residential gateway (RGW) 103. The ISP server network includes a BNG 104. The ICP server network includes an ICP server 105. The ICP server network is connected to the ISP server network by using the Internet.

For example, the ICP server 105 may be a file server (file server), a web server (web server), or a video server (video server).

Figure 2:
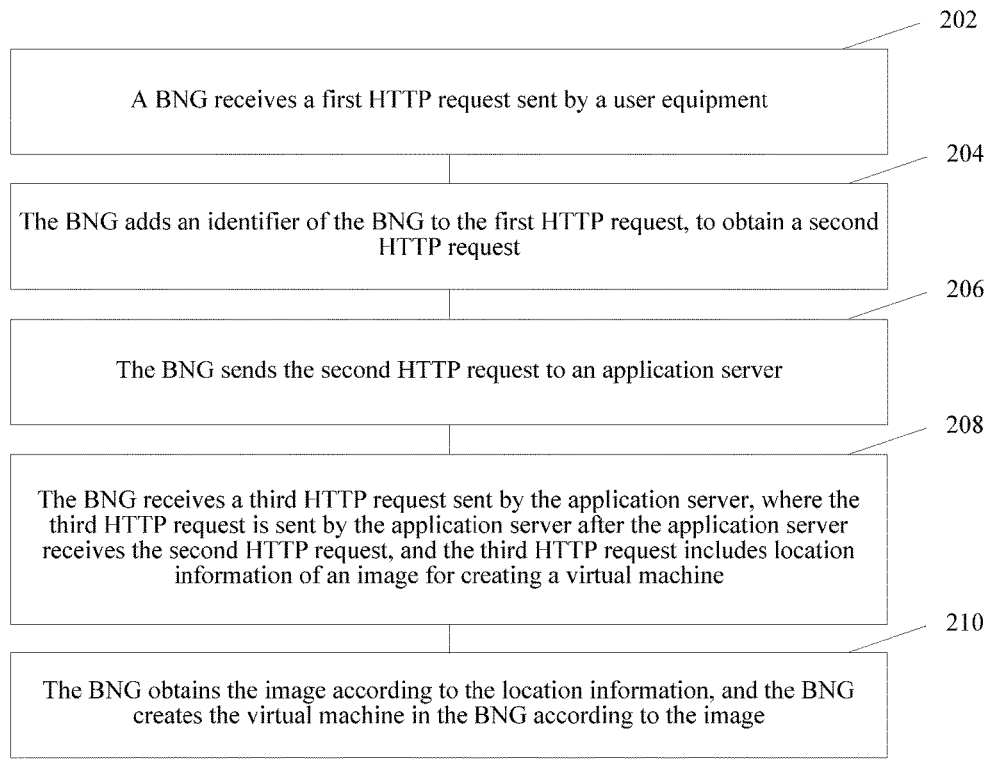
FIG. 2 is a schematic flowchart of a method used for an HTTP network according to an embodiment of the present invention.

FIG. 2 is a schematic flowchart of a method used for an HTTP network according to an embodiment of the present invention. The method may be used in the networking structure shown in FIG. 1. Specifically, the method may be executed by the BNG 104 in FIG. 1. Referring to FIG. 2, the method includes the following steps.

202: A BNG receives a first HTTP request sent by user equipment.

For example, the user equipment may be a personal computer, a personal digital assistant, a mobile phone, or a set top box.

For example, an application client may trigger the user equipment to send the first HTTP request.

For example, a service corresponding to the application client may be a storage service, an instant messaging service, or a search engine service.

For example, the user equipment in FIG. 2 may be the personal computer 102 in FIG. 1.

204: The BNG adds an identifier of the BNG to the first HTTP request, to obtain a second HTTP request.

For example, the identifier of the BNG may be a host name of the BNG, an IP address of the BNG, or a URL for identifying how to access the BNG.

206: The BNG sends the second HTTP request to an application server.

For example, the application server may be a video server, an audio server, a web server, or a file server.

For example, an application server end runs on the application server, and the application client corresponds to the application server end.

For example, the application server in FIG. 2 may be the ICP server 105 in FIG. 1.

208: The BNG receives a third HTTP request sent by the application server, where the third HTTP request is sent by the application server after the application server receives the second HTTP request, and the third HTTP request includes location information of an image for creating a virtual machine.

For example, the second HTTP request is used to enable the application server to send the third HTTP request.

For example, the virtual machine may include an operating system. The operating system may run on the virtual machine. The operating system may be Windows or Linux. For example, the application server end may run in the operating system.

For example, the virtual machine includes the application server end, where the application server end runs on the virtual machine.

210: The BNG obtains the image according to the location information, and the BNG creates the virtual machine in the BNG according to the image.

For example, the BNG may create the virtual machine in the BNG by using a hypervisor.

In the foregoing technical solution, the BNG creates the virtual machine in the BNG according to the image. The application server end runs on the virtual machine. After the virtual machine on which the application server end runs is deployed on the BNG, a service corresponding to the application client may be implemented through an interaction between the application server end on the BNG and the application client on the user equipment. The BNG does not need to forward, to the application server, the HTTP request sent by the user equipment. Therefore, the foregoing technical solution helps reduce occupation of bandwidth of a network.

Optionally, in the method shown in FIG. 2, after the sending, by the BNG, the second HTTP request to an application server, and before receiving, by the BNG, a third HTTP request sent by the application server, the method may further include establishing, by the BNG, an HTTP connection to the application server.

For example, the establishing, by the BNG, an HTTP connection to the application server includes receiving, by the BNG, a request that is sent by the application server according to the identifier of the BNG in the second HTTP request and is used for establishing the HTTP connection.

Optionally, in the method described in FIG. 2, after the creating, by the BNG, the virtual machine in the BNG according to the image, the method further includes:

212: The BNG sends a first HTTP response to the application server, where the first HTTP response is a response corresponding to the third HTTP request, and the first HTTP response includes an identifier of the virtual machine.

214: The BNG receives a second HTTP response sent by the application server, where the second HTTP response is a response corresponding to the second HTTP request, and the second HTTP response includes the identifier of the virtual machine.

216: The BNG forwards the second HTTP response to the user equipment.

Figure 3:
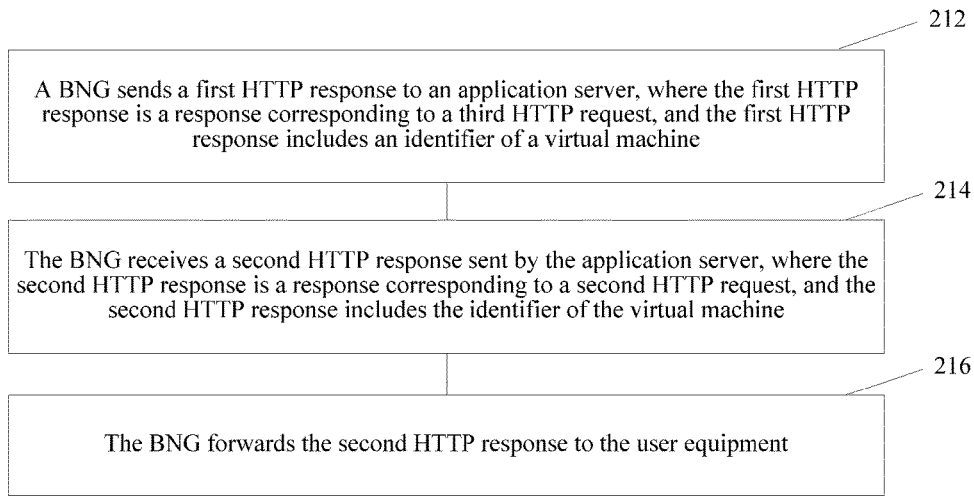
FIG. 3 is a schematic flowchart of a method used for an HTTP network according to an embodiment of the present invention.

For 212, 214, and 216, refer to FIG. 3.

Optionally, in the foregoing technical solution, the second HTTP response is used to enable the application client to send an HTTP request to the virtual machine by using the user equipment.

Optionally, in the foregoing technical solution, the identifier of the BNG includes a host name of the BNG, an IP address of the BNG, or a URL for identifying how to access the BNG.

Optionally, in the foregoing technical solution, the location information includes a URL for identifying how to access the image or includes a directory in which the image is stored in the BNG.

For example, the image may be prestored in the BNG. The BNG may obtain the image according to the directory.

For example, the image may be prestored in a network server. The BNG may obtain the image according to the URL. The network server may be a router or a switch.

Optionally, in the foregoing technical solution, the second HTTP request includes an MD, where the MD is obtained by performing an encryption operation on the identifier of the BNG according to an MD5.

For example, the MD may be carried in a header field of the second HTTP request or a payload of the second HTTP request.

Optionally, in the foregoing technical solution, the third HTTP request includes configuration information of the virtual machine. The creating, by the BNG, the virtual machine in the BNG according to the image includes: creating, by the BNG, the virtual machine in the BNG according to the image and the configuration information.

For example, the configuration information may include a hardware resource that is allocated for the virtual machine that is to be created. The hardware resource may include a central processing unit (CPU), a memory, or a register.

For example, the configuration information may be prestored in the BNG.

Figure 4:
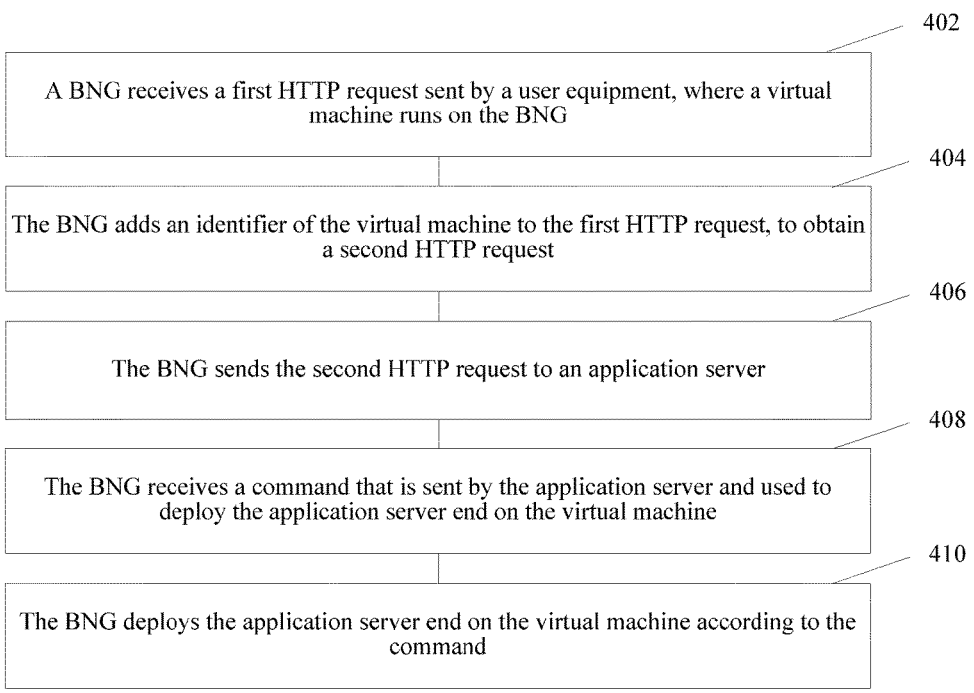
FIG. 4 is a schematic flowchart of a method used for an HTTP network according to an embodiment of the present invention.

FIG. 4 is a schematic flowchart of a method used for an HTTP network according to an embodiment of the present invention. The method may be used in the networking structure shown in FIG. 1. Specifically, the method may be executed by the BNG 104 in FIG. 1. Referring to FIG. 4, the method includes the following steps.

402: A BNG receives a first HTTP request sent by user equipment, where a virtual machine runs on the BNG.

For example, the user equipment may be a personal computer, a personal digital assistant, a mobile phone, or a set top box.

For example, an application client may trigger the user equipment to send the first HTTP request.

For example, a service corresponding to the application client may be a storage service, an instant messaging service, or a search engine service.

For example, the virtual machine may include an operating system. The operating system may run on the virtual machine. The operating system may be Windows or Linux.

For example, the user equipment in FIG. 4 may be the personal computer 102 in FIG. 1.

404: The BNG adds an identifier of the virtual machine to the first HTTP request, to obtain a second HTTP request.

For example, the identifier of the virtual machine may be a host name of the virtual machine, an IP address of the virtual machine, or a URL for identifying how to access the virtual machine.

406: The BNG sends the second HTTP request to an application server.

For example, the application server may be a video server, an audio server, a web server, or a file server.

For example, an application server end runs on the application server, and the application client corresponds to the application server end.

For example, the application server in FIG. 4 may be the ICP server 105 in FIG. 1.

408: The BNG receives a command that is sent by the application server and used to deploy the application server end on the virtual machine.

For example, the application server may remotely log in to the BNG. For example, the application server may remotely log in to the BNG by using telnet.

For example, the BNG receives a command that is sent by the application server by using a user interface of telnet and that is used to deploy the application server end on the virtual machine.

For example, the command may be an HTTP request, where the HTTP request includes location information of the application server end.

For example, the location information includes a URL for identifying how to access the application server end or includes a directory in which the application server end is stored in the BNG.

For example, the application server end may be prestored in the BNG. The BNG may obtain the application server end according to the directory.

For example, the application server end may be prestored in a network server. The BNG may obtain the application server end according to the URL. The network server may be a router or a switch.

410: The BNG deploys the application server end on the virtual machine according to the command.

For example, the BNG may run the application server end on the virtual machine.

For example, the application server end may run in the operating system.

In the foregoing technical solution, the BNG deploys the application server end on the virtual machine according to the command that is sent by the application server and used to deploy the application server end on the virtual machine. After the BNG deploys the application server end on the virtual machine, a service corresponding to the application client may be implemented through an interaction between the application server end on the BNG and the application client on the user equipment. The BNG does not need to forward, to the application server, the HTTP request sent by the user equipment. Therefore, the foregoing technical solution helps reduce occupation of bandwidth of a network.

Optionally, in the method described in FIG. 4, after the deploying, by the BNG, the application server end on the virtual machine according to the command, the method further includes:

502: The BNG receives a first HTTP response sent by the application server, where the first HTTP response includes an identifier of the virtual machine, and the first HTTP response is a response corresponding to the second HTTP request.

504: The BNG forwards the first HTTP response to the user equipment.

Figure 5:
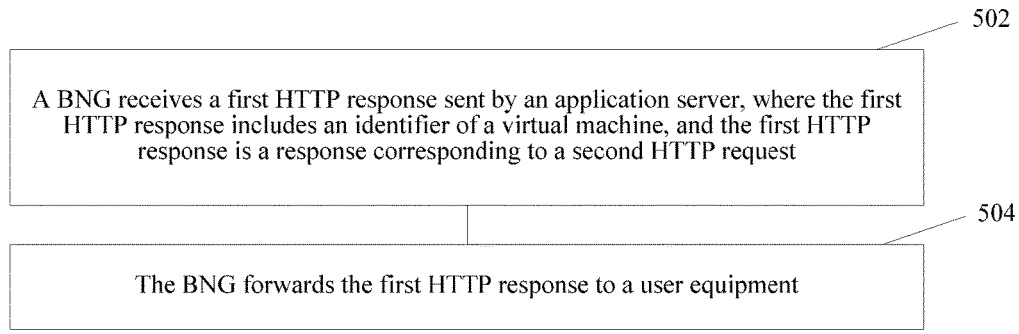
FIG. 5 is a schematic flowchart of a method used for an HTTP network according to an embodiment of the present invention.

For 502 and 504, refer to FIG. 5.

Optionally, in the foregoing technical solution, the first HTTP response is used to enable the application client to send an HTTP request to the virtual machine by using the user equipment.

Optionally, in the foregoing technical solution, the identifier of the virtual machine includes a host name of the virtual machine, an IP address of the virtual machine, or a URL for identifying how to access the virtual machine.

Optionally, in the foregoing technical solution, the identifier of the virtual machine is carried in a header field or a payload of the first HTTP response.

Optionally, in the foregoing technical solution, the second HTTP request includes an MD, where the MD is obtained by performing an encryption operation on the identifier of the virtual machine according to an MD5.

Figure 6:
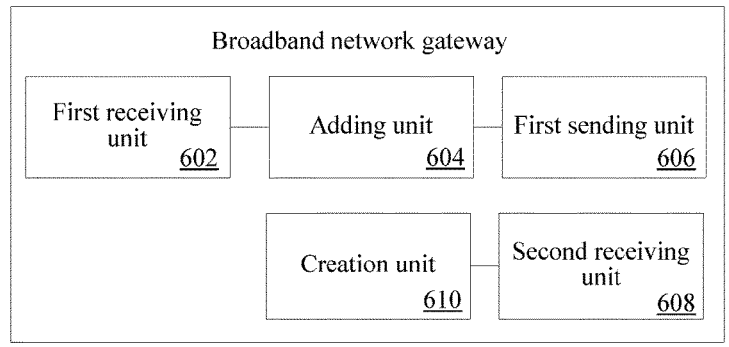
FIG. 6 is a schematic structural diagram of a BNG according to an embodiment of the present invention.

FIG. 6 is a schematic structural diagram of a BNG according to an embodiment of the present invention. The BNG may be used to execute the method shown in FIG. 2. The BNG may be used in the networking structure shown in FIG. 1. Specifically, the BNG may be the BNG 104 in FIG. 1. Referring to FIG. 6, the BNG includes: a first receiving unit 602, an adding unit 604, a first sending unit 606, a second receiving unit 608, and a creation unit 610.

The first receiving unit 602 is configured to receive a first HTTP request sent by user equipment.

For example, the user equipment may be a personal computer, a personal digital assistant, a mobile phone, or a set top box.

For example, an application client may trigger the user equipment to send the HTTP request.

For example, a service corresponding to the application client may be a storage service, an instant messaging service, or a search engine service.

For example, the user equipment may be the personal computer 102 in FIG. 1.

For example, the first receiving unit 602 may be a first receiver.

The adding unit 604 is configured to add an identifier of the BNG to the first HTTP request received by the first receiving unit 602, to obtain a second HTTP request.

For example, the identifier of the BNG may be a host name of the BNG, an IP address of the BNG, or a URL for identifying how to access the BNG.

For example, the adding unit 604 may be a processor.

The first sending unit 606 is configured to send the second HTTP request generated by the adding unit 604 to an application server.

For example, the application server may be a video server, an audio server, a web server, or a file server.

For example, an application server end runs on the application server, and the application client corresponds to the application server end.

For example, the application server may be the ICP server 105 in FIG. 1.

For example, the first sending unit 606 may be a first transmitter.

The second receiving unit 608 is configured to receive a third HTTP request sent by the application server, where the third HTTP request is sent by the application server after the application server receives the second HTTP request, and the third HTTP request includes location information of an image for creating a virtual machine.

For example, the second HTTP request is used to enable the application server to send the third HTTP request.

For example, the virtual machine may include an operating system. The operating system may run on the virtual machine. The operating system may be Windows or Linux. For example, the application server end may run in the operating system.

For example, the virtual machine includes the application server end, where the application server end runs on the virtual machine.

For example, the second receiving unit 608 may be a second receiver. The second receiver and the first transmitter may be a same transceiver.

The creation unit 610 is configured to obtain the image according to the location information in the third HTTP request received by the second receiving unit 608, and create the virtual machine in the BNG according to the image.

For example, the creation unit 610 may create the virtual machine in the BNG by using a hypervisor.

For example, the creation unit 610 may be the processor.

In the foregoing technical solution, the BNG creates the virtual machine in the BNG according to the image. The application server end runs on the virtual machine. After the virtual machine on which the application server end runs is deployed on the BNG, a service corresponding to the application client may be implemented through an interaction between the application server end on the BNG and the application client on the user equipment. The BNG does not need to forward, to the application server, the HTTP request sent by the user equipment. Therefore, the foregoing technical solution helps reduce occupation of bandwidth of a network.

Optionally, in the BNG shown in FIG. 6, the BNG may further include an establishing unit, configured to: after the first sending unit 606 sends the second HTTP request to the application server, and before the second receiving unit 608 receives the third HTTP request sent by the application server, establish an HTTP connection to the application server.

For example, the establishing unit is configured to receive a request that is sent by the application server according to the identifier of the BNG in the second HTTP request and is used for establishing the HTTP connection.

For example, the creation unit may be the processor.

Optionally, the BNG shown in FIG. 6 may further include: a second sending unit 612, a third receiving unit 614, and a forwarding unit 616.

The second sending unit 612 is configured to send a first HTTP response to the application server, where the first HTTP response is a response corresponding to the third HTTP request received by the second receiving unit 608, and the first HTTP response includes an identifier of the virtual machine.

For example, the second sending unit 612 may be a second transmitter. The second transmitter and the first transmitter may be a same transmitter.

The third receiving unit 614 is configured to receive a second HTTP response sent by the application server, where the second HTTP response is a response corresponding to the second HTTP request, and the second HTTP response includes an identifier of the virtual machine.

For example, the third receiving unit 614 may be a third receiver. The third receiver and the second receiver may be a same receiver.

The forwarding unit 616 is configured to forward the second HTTP response received by the third receiving unit 614 to the user equipment.

For example, the forwarding unit may be a transmitter. The transmitter and the first receiver may be a same transceiver.

Figure 7:
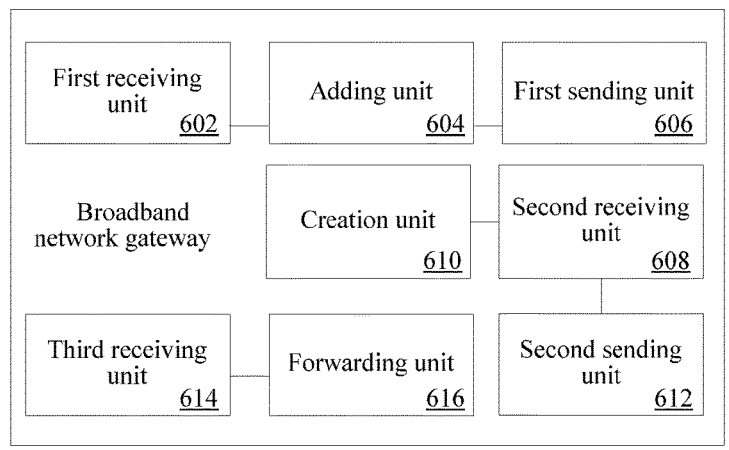
FIG. 7 is a schematic structural diagram of a BNG according to an embodiment of the present invention.

For the second sending unit 612, the third receiving unit 614, and the forwarding unit 616, refer to FIG. 7.

Optionally, in the foregoing technical solution, the identifier of the BNG includes a host name of the BNG, an IP address of the BNG, or a URL for identifying how to access the BNG.

Optionally, in the foregoing technical solution, the location information includes a URL for identifying how to access the image or includes a directory in which the image is stored in the BNG.

For example, the image may be prestored in the BNG. The BNG may obtain the image according to the directory.

For example, the image may be prestored in a network server. The BNG may obtain the image according to the URL. The network server may be a router or a switch.

Optionally, in the foregoing technical solution, the second HTTP request includes an MD, where the MD is obtained by performing an encryption operation on the identifier of the BNG according to an MD5.

For example, the MD may be carried in a header field of the second HTTP request or a payload of the second HTTP request.

Optionally, in the foregoing technical solution, the third HTTP request includes configuration information of the virtual machine. The creation unit 610 is configured to create the virtual machine in the BNG according to the image and the configuration information.

For example, the configuration information may include a hardware resource that is allocated for the virtual machine to be created. The hardware resource may include a central processing unit (CPU), a memory, or a register.

For example, the configuration information may be prestored in the BNG.

Figure 8:
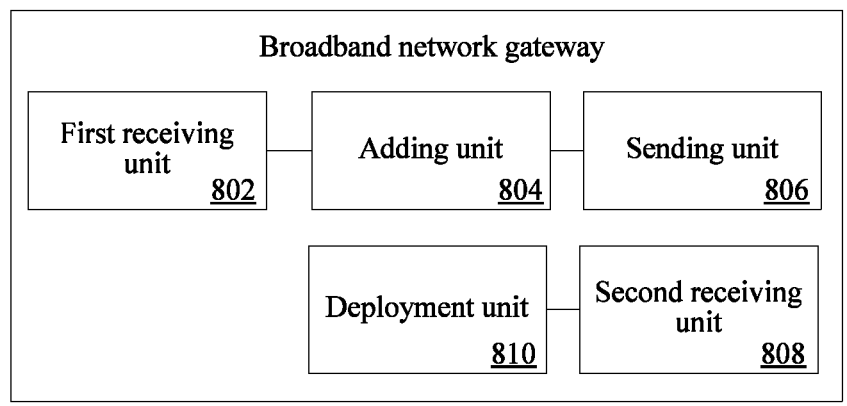
FIG. 8 is a schematic structural diagram of a BNG according to an embodiment of the present invention.

FIG. 8 is a schematic structural diagram of a BNG according to an embodiment of the present invention. The BNG may be configured to execute the method shown in FIG. 4. The BNG may be used in the networking structure shown in FIG. 1. Specifically, the BNG may be the BNG 104 in FIG. 1. Referring to FIG. 8, the BNG includes: a first receiving unit 802, an adding unit 804, a sending unit 806, a second receiving unit 808, and a deployment unit 810.

The first receiving unit 802 is configured to receive a first HTTP request sent by user equipment, where a virtual machine runs on the BNG.

For example, the user equipment may be a personal computer, a personal digital assistant, a mobile phone, or a set top box.

For example, an application client may trigger the user equipment to send the first HTTP request.

For example, a service corresponding to the application client may be a storage service, an instant messaging service, or a search engine service.

For example, the virtual machine may include an operating system. The operating system may run on the virtual machine. The operating system may be Windows or Linux.

For example, the user equipment may be the personal computer 102 in FIG. 1.

For example, the first receiving unit may be a first receiver.

The adding unit 804 is configured to add an identifier of the virtual machine to the first HTTP request received by the first receiving unit 802, to obtain a second HTTP request.

For example, the identifier of the virtual machine may be a host name of the virtual machine, an IP address of the virtual machine, or a URL for identifying how to access the virtual machine.

For example, the adding unit 804 may be a processor.

The sending unit 806 is configured to send the second HTTP request generated by the adding unit 804 to an application server.

For example, the application server may be a video server, an audio server, a web server, or a file server.

For example, an application server end runs on the application server, and the application client corresponds to the application server end.

For example, the application server may be the application server 103 in FIG. 1.

For example, the sending unit 806 may be a transmitter.

The second receiving unit 808 is configured to receive a command that is sent by the application server and used to deploy the application server end on the virtual machine.

For example, the application server may remotely log in to the BNG. For example, the application server may remotely log in to the BNG by using telnet.

For example, the second receiving unit 808 receives a command that is sent by the application server by using a user interface of telnet and that is used to deploy the application server end on the virtual machine.

For example, the command may be an HTTP request, where the HTTP request includes location information of the application server end.

For example, the location information includes a URL for identifying how to access the application server end or includes a directory in which the application server end is stored in the BNG.

For example, the application server end may be prestored in the BNG. The BNG may obtain the application server end according to the directory.

For example, the application server end may be prestored in the network server. The BNG may obtain the application server end according to the URL. The network server may be a router or a switch.

For example, the second receiving unit 808 may be a second receiver. The second receiver and the transmitter may be a same transceiver.

The deployment unit 810 is configured to deploy the application server end on the virtual machine according to the command received by the second receiving unit 808.

For example, the deployment unit 810 may run the application server end on the virtual machine.

For example, the application server end may run in the operating system.

For example, the deployment unit 810 may be the processor.

In the foregoing technical solution, the BNG deploys the application server end on the virtual machine according to the command that is sent by the application server and used to deploy the application server end on the virtual machine. After the BNG deploys the application server end on the virtual machine, a service corresponding to the application client may be implemented through an interaction between the application server end on the BNG and the application client on the user equipment. The BNG does not need to forward, to the application server, the HTTP request sent by the user equipment. Therefore, the foregoing technical solution helps reduce occupation of bandwidth of a network.

Optionally, the BNG shown in FIG. 8 may further include: a third receiving unit 812 and a forwarding unit 814.

The third receiving unit 812 is configured to receive a first HTTP response sent by the application server, where the first HTTP response includes an identifier of the virtual machine, and the first HTTP response is a response corresponding to the second HTTP request.

For example, the third receiving unit 812 may be a third receiver. The third receiver and the second receiver may be a same receiver.

The forwarding unit 814 is configured to forward the first HTTP response received by the third receiving unit 812 to the user equipment.

For example, the forwarding unit 814 may be a first transmitter. The first transmitter and the first receiver may be a same transceiver.

Figure 9:
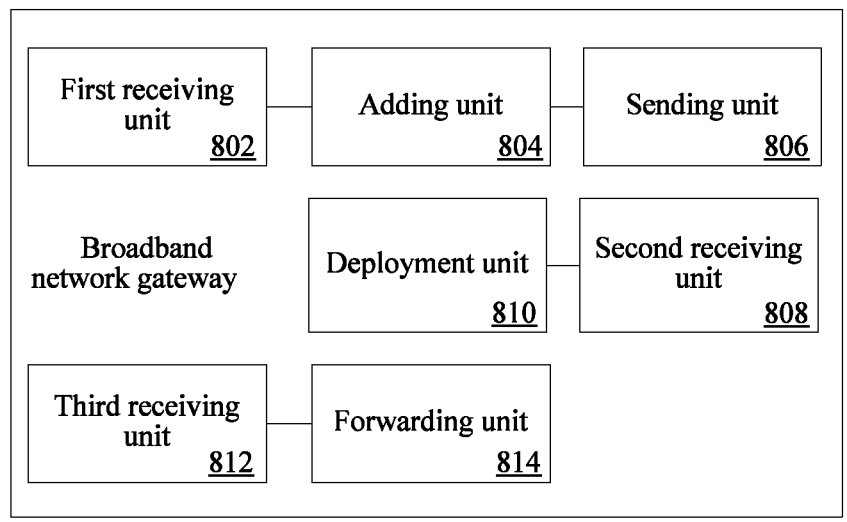
FIG. 9 is a schematic structural diagram of a BNG according to an embodiment of the present invention.

For the third receiving unit 812 and the forwarding unit 814, refer to FIG. 9.

Optionally, in the foregoing technical solution, the first HTTP response is used to enable the application client to send an HTTP request to the virtual machine by using the user equipment.

Optionally, in the foregoing technical solution, the identifier of the virtual machine includes a host name of the virtual machine, an IP address of the virtual machine, or a URL for identifying how to access the virtual machine.

Optionally, in the foregoing technical solution, the identifier of the virtual machine is carried in a header field or a payload of the first HTTP response.

Optionally, in the foregoing technical solution, the second HTTP request includes an MD, where the MD is obtained by performing an encryption operation on the identifier of the virtual machine according to an MD5.

Figure 10:
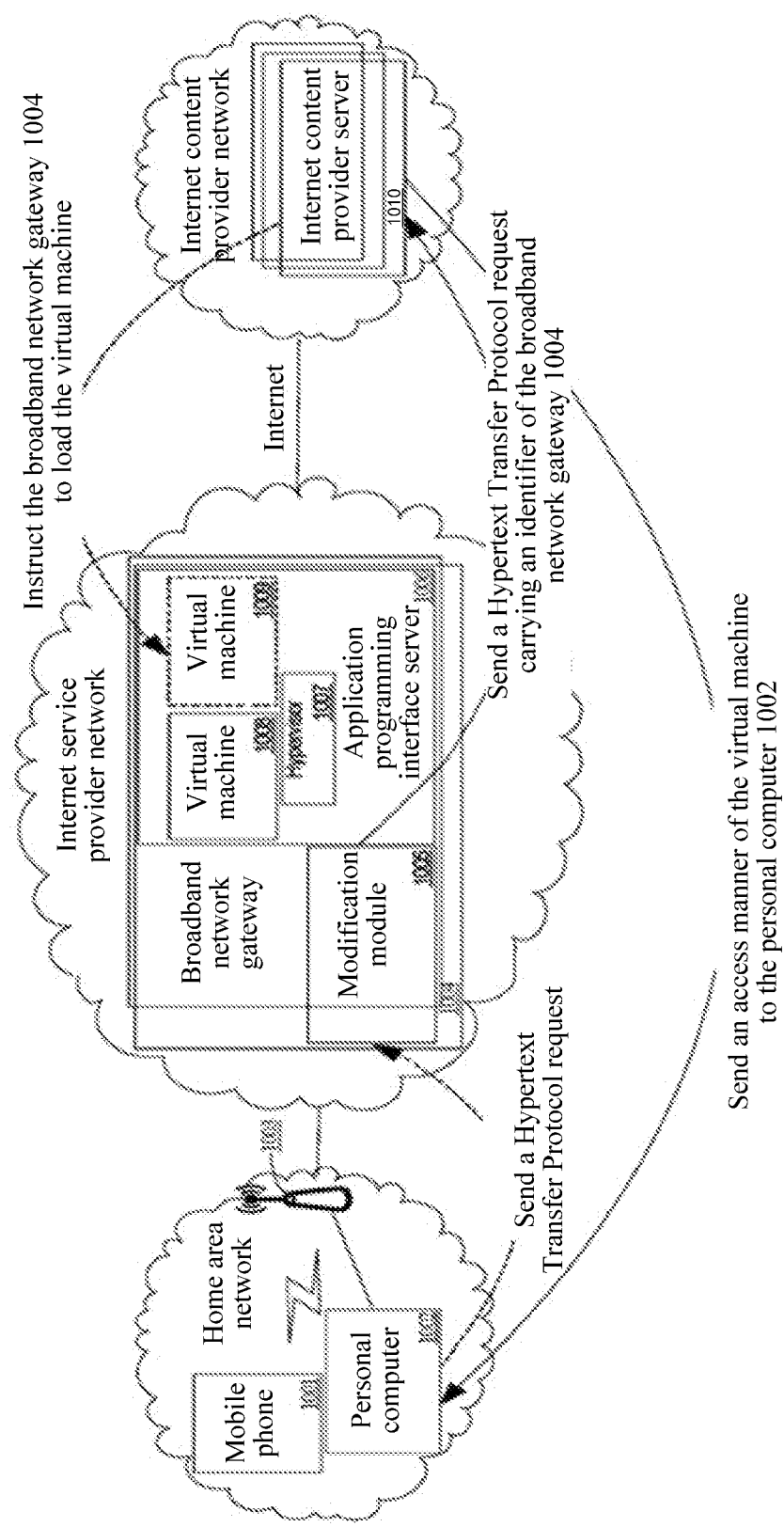
FIG. 10 is a schematic diagram of an application scenario of a method used for an HTTP network according to an embodiment of the present invention.

FIG. 10 is a schematic diagram of an application scenario of a method used for an HTTP network according to an embodiment of the present invention.

The application scenario shown in FIG. 10 includes a home area network, an ISP server network, and an ICP server network. The home area network includes multiple UEs. The multiple UEs include a mobile phone 1001 and a personal computer 1002. The home area network further includes an RGW 1003. The ISP server network includes multiple BNGs. The multiple BNGs include a BNG 1004. The BNG 1004 includes a modification module 1005 and an application programming interface server (API server) 1006. The API server 1006 includes a hypervisor 1007. The ICP server network includes multiple ICP servers. The multiple ICP servers include an ICP server 1010.

Referring to FIG. 10, the personal computer 1002 sends an HTTP request to the ICP server 1010. After the HTTP request arrives at the BNG 1004, the modification module 1005 adds an identifier of the BNG 1004 to the HTTP request, to generate an HTTP request carrying the identifier of the BNG 1004. The BNG 1004 sends the HTTP request carrying the identifier of the BNG 1004 to the ICP server 1010 by using the Internet. After receiving the HTTP request carrying the identifier of the BNG 1004, the ICP server 1010 instructs the BNG 1004 to load a VM 1009.

Referring to FIG. 10, the API server 1006 used for loading the VM 1009 is deployed on the BNG 1004. The API server 1006 provides an application programming interface (API) used for loading a VM, for the ICP server 1010 to invoke. The following provides an example about how to invoke the API used for loading a VM. The ICP server 1010 may send an HTTP request to the BNG 1004, so as to invoke an API used for loading the VM 1009. A format of the HTTP request may be:

```
POST /version1/virualmachine HTTP/1.1
Host: virtualmachine.api.bng1234.huawei.com
Content-Type: application/json
Accept: application/xml
{
   "virtualmachine" : {
      "name" : "ICP1server1",
      "imageRef" : "http://api.icp1.com/images/
52415800-8b69-11e0-9b19-734f6f006e54",
      "configurationid": "52415800-8b69-11e0-9b19-734f1195ff37",
   }
}
```

Host is a host name of the API server 1006. Host names of API servers provided by different BNGs are different, and the ICP server 1010 needs to determine a BNG, accessed by the ICP server, on an ISP network. Content of "imageRef" is used to provide the BNG 1004 with a guidance indicating where to acquire an image file corresponding to the VM 1009. "configurationid" is used to provide a guidance about a resource allocated for the VM 1009 by the BNG 1004, for example, a quantity of CPUs, a capacity of memory, and a capacity of a disk. By invoking the API used for loading the VM 1009, the ICP server 1010 can drive the BNG 1004 to load the VM 1009.

The BNG 1004 includes the modification module 1005, which may insert a newly-defined header field into the HTTP request initiated by the personal computer 1002.

Figure 11:
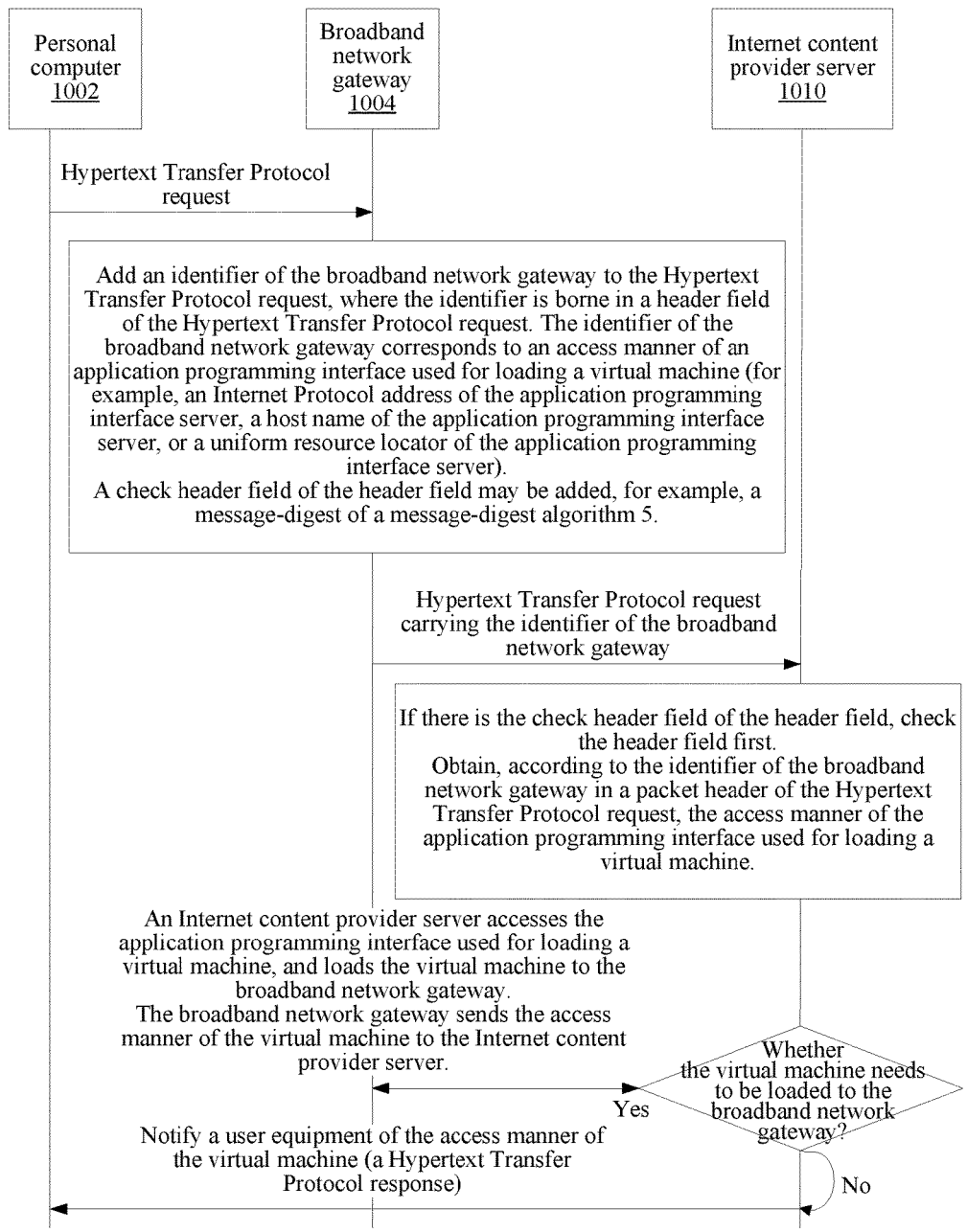
FIG. 11 is a schematic diagram of a signaling interaction in the application scenario shown in FIG. 10.

FIG. 11 is schematic diagram of a signaling interaction in the application scenario shown in FIG. 10. As shown in FIG. 11, a process of the interaction includes:

1. The personal computer 1002 sends a service request to the ICP server 1010. The service request may be an HTTP request.

For example, a format of the HTTP request may be:
GET http://www.icp1.com/HTTP/1.1
Host: www.icp1.com
Accept: application/json, text/javascript, */*
Accept-Encoding: gzip, deflate
User-Agent: Mozilla/4.0 (compatible; MSIE 7.0; Windows NT 6.0; SLCC1; .NET CLR 2.0.50727; .NET CLR 3.5.30729; .NET CLR 3.0.30618; .NET4.0C)
Another header field
HTTP payload 2. The modification module 1005 of the BNG 1004 inserts the identifier of the BNG 1004 into a packet header of the HTTP request. The identifier of the BNG 1004 is carried in the new header field. The identifier of the BNG 1004 is an access manner, provided by the BNG 1004, of the API used for loading a VM. (For example, an IP address of the API server 1006, a host name of the API server 1006, or a URL of the API server 1006.)

This embodiment provides three representation manners of the format of the newly-defined header field.

For example, the IP address of the API server 1006 may be:
Bng-Api-Server: 11.22.1.1
For example, the host name of the API server 1006 may be:
Bng-Api-Server: virtualmachine.api.bng1234.huawei.com
For example, the URL of the API server 1006 may be:
Bng-Api-URL: virtualmachine.api.bng1234.huawei.com//version1/virualmachine After the identifier of the BNG 1004 is inserted, the format of the HTTP request may be:
GET http://www.icp1.com/HTTP/1.1
Host: www.icp1.com
Accept: application/json, text/javascript, */*
Accept-Encoding: gzip, deflate
User-Agent: Mozilla/4.0 (compatible; MSIE 7.0; Windows NT 6.0; SLCC1; .NET CLR 2.0.50727; .NET CLR 3.5.30729; .NET CLR 3.0.30618; .NET4.0C)
Bng-Api-URL: virtualmachine.api.bng1234.huawei.com/version1/virualmachine
Another header field;
HTTP payload 3. The HTTP request generated by the modification module 1005 may include a check header field of the header field, for example, a message-digest of a message-digest algorithm 5. The check header field is used to verify completeness of the newly-added header field.

4. The BNG 1004 sends the modified HTTP request to the ICP server 1010.

5. The ICP server 1010 obtains, according to the identifier of the BNG 1004 in the packet header of the HTTP request, an access manner of the API used for loading the VM 1009. For example, the ICP server 1010 may access, by using the IP address of the API server 1006, the host name of the API server 1006, or the URL of the API server 1006, the API used for loading the VM 1009.

6. The ICP server 1010 accesses the API, provided by the BNG 1004, used for loading the VM 1009, to load the VM 1009 to the BNG 1004. The ICP server 1010 obtains an access manner of the VM 1009. A specific implementation may be:

The ICP server 1010 determines that the VM 1009 that serves the ICP server 1010 is not loaded on the BNG 1004, or the ICP server 1010 determines that a quantity of users in the BNG 1004 that request the ICP server 1010 to provide a service exceeds a threshold, and decides to load the VM 1009 on the BNG 1004.

The ICP server 1010 invokes the API, provided by the BNG 1004, used for loading the VM 1009, which specifically may be that the ICP server 1010 sends an HTTP request to the BNG 1004. The HTTP request carries a parameter required for loading the VM 1009. For example, the format of the HTTP request may be:

```
POST /version1/virualmachine HTTP/1.1
Host: virtualmachine.api.bng1234.huawei.com
Content-Type: application/json
Accept: application/xml
{
  "virtualmachine" : {
    "name" : "ICP1server1",
    "imageRef" : "http://api.icp1.com/images/52415800-8b69-11e0-9b19-734f6f006e54",
    "configurationid": "52415800-8b69-11e0-9b19-734f1195ff37",
  }
}
```

The BNG 1004 completes, according to the parameter required for loading the VM 1009, a process of loading the VM 1009. The BNG 1004 sends an HTTP response to the ICP server 1010. The HTTP response carries the access manner of the VM 1009. The access manner may be an IP address of the VM 1009 or a host name of the VM 1009.

7. The ICP server 1010 notifies the personal computer 1002 of the access manner of the VM 1009, which may be implemented by sending an HTTP response to the personal computer 1002. The HTTP response may carry the IP address of the VM 1009 or the host name of the VM 1009.

The access manner of the VM 1009 may be carried in a payload of the HTTP response. For example, the format of the HTTP response may be:
HTTP/1.0 200 OK
Content-Type: text/html
Another header field
HTTP payload (including the access manner of the VM 1009, for example, vmip=33.1.1.1; vm-host-name=vm33.isp1.com)

The access manner of the VM 1009 may be carried in HTTP redirection. A format of the HTTP redirection may be:
HTTP/1.1 302 Found
Location: http://vm33.isp1.com
Another header field FIG. 12 is a schematic diagram of an application scenario of a method used for an HTTP network according to an embodiment of the present invention.

Figure 12:
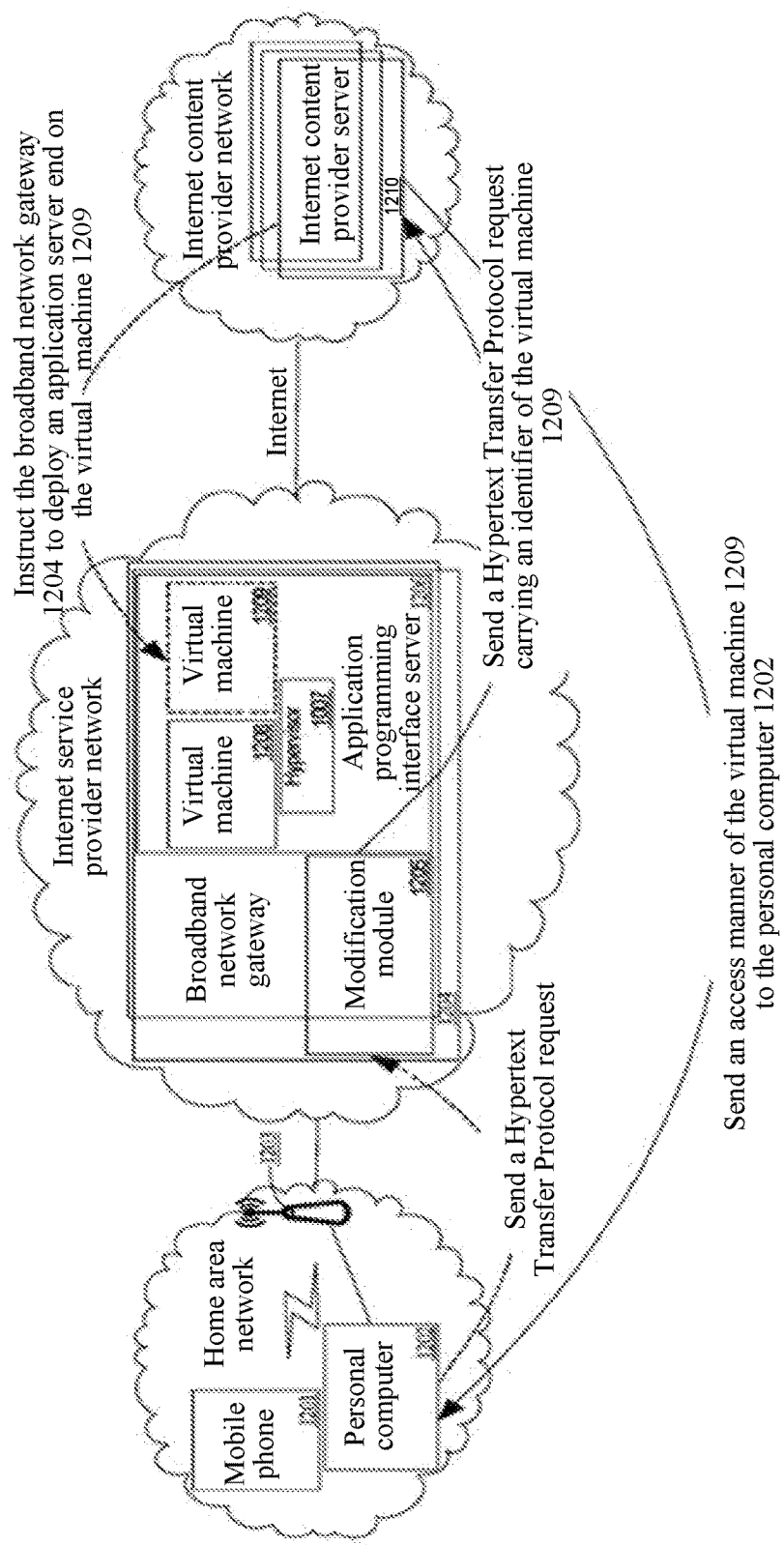
FIG. 12 is a schematic diagram of an application scenario of a method used for an HTTP network according to an embodiment of the present invention.

The application scenario shown in FIG. 12 includes a home area network, an ISP server network, and an ICP server network. The home area network includes multiple UEs. The multiple UEs include a mobile phone 1201 and a personal computer 1202. The home area network further includes an RGW 1203. The ISP server network includes multiple BNGs. The multiple BNGs include a BNG 1204. The BNG 1204 includes a modification module 1205 and an API server 1206. The API server 1206 includes a hypervisor 1207. The ICP server network includes multiple ICP servers. The multiple ICP servers include an ICP server 1210.

Referring to FIG. 12, the personal computer 1202 sends an HTTP request to the ICP server 1210. After the HTTP request arrives at the BNG 1204, the modification module 1205 adds an identifier of a VM 1209 to the HTTP request, to generate an HTTP request carrying the identifier of the VM 1209. The BNG 1204 sends the HTTP request carrying the identifier of the VM 1209 to the ICP server 1210 by using the Internet. After receiving the HTTP request carrying the identifier of the VM 1209, the ICP server 1210 instructs the BNG 1204 to deploy an application server end on the VM 1209.

Referring to FIG. 12, the API server 1206 used for loading the VM 1209 is deployed on the BNG 1004. The modification module 1205 may obtain the identifier of the VM 1209 from the API server 1206, and thereby generate the HTTP request carrying the identifier of the VM 1209. The identifier of the VM 1209 may be carried in a header field of a packet header of the HTTP request. The identifier of the VM 1209 may be an IP address of the VM 1209 or a host name of the VM 1209.

For example, a format of the IP address of the VM 1209 may be:
Bng-allocated-Server:33.1.1.1

Figure 13:
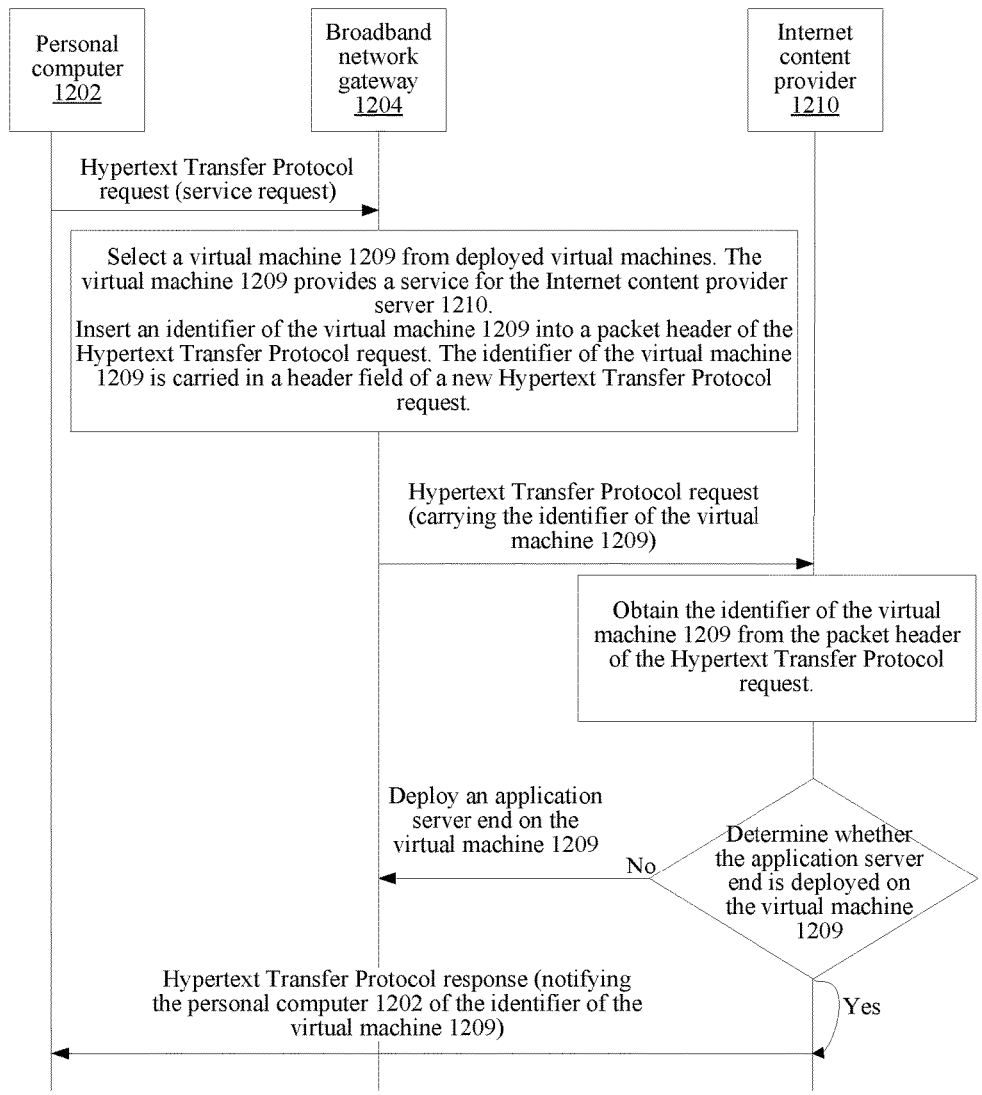
FIG. 13 is schematic diagram of a signaling interaction in the application scenario shown in FIG. 12.

For example, a format of the host name of the VM 1209 may be:
Bng-allocated-Server: vm33.isp1.com FIG. 13 is schematic diagram of a signaling interaction in the application scenario shown in FIG. 12. As shown in FIG. 13, a process of the interaction includes the following interactions.

1. The personal computer 1202 sends a service request to the ICP server 1210. The service request may be an HTTP request.

2. The packet modification module 1205 of the BNG 1204 inserts the identifier of the VM 1209 into a packet header of the HTTP request. The identifier of the VM 1209 may be carried in a header field of a packet header of the HTTP request. The identifier of the VM 1209 may be an IP address of the VM 1209 or a host name of the VM 1209.

3. The BNG 1204 sends the modified HTTP request to the ICP server 1210.

4. The ICP server 1210 determines whether the application server end is deployed on the VM 1209. If the application server end has not been deployed on the VM 1209, the ICP server 1210 sends, by using a user interface of telnet, a command to deploy the application server end on the VM 1209 to the BNG 1204.

5. The BNG 1204 deploys the application server end on the VM 1209.

6. The ICP server 1210 sends an HTTP response to the personal computer 1202. The HTTP response carries the identifier of the VM 1209. The identifier of the VM 1209 may be an IP address of the VM 1209 or a host name of the VM 1209. Therefore, the personal computer 1202 obtains an access manner of the VM 1209.

The access manner of the VM 1209 may be carried in a payload of an HTTP packet. For example, a format of the HTTP response may be:
HTTP/1.0 200 OK
Content-Type: text/html
Another header field
HTTP payload (including the access manner of the VM 1009, for example, vmip=33.1.1.1; vm-hostname=vm33.isp1.com)

The access manner of the VM 1209 may be carried in HTTP redirection. A format of the HTTP redirection may be:
HTTP/1.1 302 Found
Location: http://vm33.isp1.com
Another header field A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division may merely be logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method used for a Hypertext Transfer Protocol (HTTP) network, the method comprising:
   receiving, by a broadband network gateway (BNG), a first HTTP request sent by a user equipment;
   adding, by the BNG, an identifier of the BNG to the first HTTP request, to obtain a second HTTP request, wherein the second HTTP request is used to obtain location information of an image for creating a virtual machine;
   sending, by the BNG, the second HTTP request to an application server;
   receiving, by the BNG, a third HTTP request sent by the application server, wherein the third HTTP request comprises the location information of the image and configuration information of the virtual machine, wherein the location information of the image comprises a uniform resource locator (URL) identifying how to access the image stored in a network server or comprises a directory in which the image is stored in the BNG;
   obtaining, by the BNG, the image according to the location information of the image; and
   creating, by the BNG, the virtual machine in the BNG according to the image and the configuration information, wherein the created virtual machine runs on the BNG.

2. The method according to claim 1, wherein, after creating the virtual machine in the BNG according to the image, the method further comprises:
   sending, by the BNG, a first HTTP response to the application server, wherein the first HTTP response is a response corresponding to the third HTTP request, and the first HTTP response comprises an identifier of the virtual machine;
   receiving, by the BNG, a second HTTP response sent by the application server, wherein the second HTTP response is a response corresponding to the second HTTP request, and the second HTTP response comprises the identifier of the virtual machine; and
   forwarding, by the BNG, the second HTTP response to the user equipment.

3. The method according to claim 1, wherein the identifier of the BNG comprises a host name of the BNG, an Internet Protocol (IP) address of the BNG, or a uniform resource locator (URL) for identifying how to access the BNG.

4. The method according to claim 1, wherein the second HTTP request comprises a message-digest (MD), wherein the MD is obtained by performing an encryption operation on the identifier of the BNG according to a message-digest algorithm 5 (MD5).

5. A method used for a Hypertext Transfer Protocol (HTTP) network, the method comprising:
   receiving, by a broadband network gateway (BNG), a first HTTP request sent by user equipment, wherein a virtual machine runs on the BNG;
   adding, by the BNG, an identifier of the virtual machine to the first HTTP request, to obtain a second HTTP request, wherein the second HTTP request is used to obtain location information of an application server end;
   sending, by the BNG, the second HTTP request to an application server;
   receiving, by the BNG, a command that is sent by the application server, wherein the command is used to deploy the application server end on the virtual machine, and the command comprises the location information of the application server end, and the location information of the application server end comprises a uniform resource locator (URL) identifying how to access the application server end or comprises a directory in which the application server end is stored in the BNG; and
   deploying, by the BNG, the application server end on the virtual machine according to the command.

6. The method according to claim 5, wherein after the deploying, the method further comprises:
   receiving, by the BNG, a first HTTP response sent by the application server, wherein the first HTTP response comprises the identifier of the virtual machine, and the first HTTP response is a response corresponding to the second HTTP request; and
   forwarding, by the BNG, the first HTTP response to the user equipment.

7. The method according to claim 6, wherein the identifier of the virtual machine is carried in a header field or a payload of the first HTTP response.

8. The method according to claim 5, wherein the identifier of the virtual machine comprises a host name of the virtual machine, an Internet Protocol (IP) address of the virtual machine, or a uniform resource locator (URL) for identifying how to access the virtual machine.

9. A broadband network gateway (BNG), comprising:
   a processor; and
   a non-transitory computer-readable storage medium storing a program to be executed by the processor, the program including instructions to:
      receive a first Hypertext Transfer Protocol (HTTP) request sent by user equipment;
      add an identifier of the BNG to the first HTTP request to obtain a second HTTP request, wherein the second HTTP request is used to obtain location information of an image for creating a virtual machine;
      send the second HTTP request to an application server;
      receive a third HTTP request sent by the application server, wherein the third HTTP request comprises the location information of the image and configuration information of the virtual machine and the location information of the image, wherein the location information of the image comprises a uniform resource locator (URL) identifying how to access the image stored in a network server or comprises a directory in which the image is stored in the BNG; and
      obtain the image according to the location information of the image in the third HTTP request, and create the virtual machine in the BNG according to the image and the configuration information, wherein the created virtual machine runs on the BNG.

10. The BNG according to claim 9, wherein the program further includes instructions to:
   send a first HTTP response to the application server, wherein the first HTTP response is a response corresponding to the third HTTP request, and the first HTTP response comprises an identifier of the virtual machine;
   receive a second HTTP response sent by the application server, wherein the second HTTP response is a response corresponding to the second HTTP request, and the second HTTP response comprises the identifier of the virtual machine; and forward the second HTTP response received by the third receiver to the user equipment.

11. The BNG according to claim 9, wherein the identifier of the BNG comprises a host name of the BNG, an Internet Protocol (IP) address of the BNG, or a uniform resource locator (URL) for identifying how to access the BNG.

12. The BNG according to claim 9, wherein the second HTTP request comprises a message-digest (MD), wherein the MD is obtained by performing an encryption operation on the identifier of the BNG according to a message-digest algorithm 5 (MD5).

13. A broadband network gateway (BNG), comprising:
a processor; and
a non-transitory computer-readable storage medium storing a program to be executed by the processor, the program including instructions for:
  receive a first Hypertext Transfer Protocol (HTTP) request sent by user equipment, wherein a virtual machine runs on the BNG;
  add an identifier of the virtual machine to the first HTTP request to obtain a second HTTP request, wherein the second HTTP request is used to obtain location information of an application server end;
  send the second HTTP request to an application server;
  receive a command that is sent by the application server, wherein the command is used to deploy the application server end on the virtual machine, and the command comprises the location information of the application server end, and the location information comprises a uniform resource locator (URL) identifying how to access the application server end or comprises a directory in which the application server end is stored in the BNG; and
  deploy the application server end on the virtual machine according to the command.

14. The BNG according to claim 13, wherein the program further includes instructions to:
  receive a first HTTP response sent by the application server, wherein the first HTTP response comprises the identifier of the virtual machine, and the first HTTP response is a response corresponding to the second HTTP request; and
  forward the first HTTP response to the user equipment.

15. The BNG according to claim 14, wherein the identifier of the virtual machine is carried in a header field or a payload of the first HTTP response.

16. The BNG according to claim 13, wherein the identifier of the virtual machine comprises a host name of the virtual machine, an Internet Protocol (IP) address of the virtual machine, or a uniform resource locator (URL) for identifying how to access the virtual machine.

* * * * *